US011475221B2

(12) United States Patent
Kalluri et al.

(10) Patent No.: US 11,475,221 B2
(45) Date of Patent: Oct. 18, 2022

(54) TECHNIQUES FOR SELECTING CONTENT TO INCLUDE IN USER COMMUNICATIONS

(71) Applicant: Oracle International Corporation, Redwood Shores, CA (US)

(72) Inventors: Sudhakar Kalluri, Cupertino, CA (US); Samba Reyes Njie, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 45 days.

(21) Appl. No.: 17/100,525

(22) Filed: Nov. 20, 2020

(65) Prior Publication Data

US 2022/0164534 A1    May 26, 2022

(51) Int. Cl.
*G06F 40/284* (2020.01)
*G06F 40/166* (2020.01)
*G06F 3/0482* (2013.01)

(52) U.S. Cl.
CPC .......... *G06F 40/284* (2020.01); *G06F 3/0482* (2013.01); *G06F 40/166* (2020.01)

(58) Field of Classification Search
None
See application file for complete search history.

(56) References Cited

U.S. PATENT DOCUMENTS

2021/0004437 A1* 1/2021 Zhang .................. G06N 3/0454
2021/0157974 A1* 5/2021 Xie ........................ G06F 40/20

* cited by examiner

*Primary Examiner* — Stella Higgs
(74) *Attorney, Agent, or Firm* — Kilpatrick Townsend & Stockton LLP

(57) ABSTRACT

Disclosed are techniques for determining the impact of including a token-set (e.g., text in the form of unigrams, bigrams, or trigrams) in a communication on a target outcome. More particularly, the present disclosure relates to techniques for determining the impact of the token-set based on, for example, the token-sets included in previous communications transmitted to user devices and the corresponding user responses to those previous communications.

20 Claims, 7 Drawing Sheets

TECHNIQUES FOR SELECTING CONTENT TO INCLUDE IN USER COMMUNICATIONS

TECHNICAL FIELD

The present disclosure generally relates to techniques for determining the impact on a target outcome of including a token-set (e.g., text in the form of unigrams, bigrams, or trigrams) in a communication. More particularly, the present disclosure relates to techniques for determining the impact of the token-set based on, for example, the token-sets included in previous communications transmitted to user devices and the corresponding user responses to those previous communications.

BACKGROUND

Communication workflows may be configured to trigger the transmission of communications to users at certain times. For example, code can be executed to trigger one or more communications to a user device over a communication channel at a given time. Each communication can include text content (e.g., a subject line, such as "Save 20%"). Selecting specific text content for a given communication to a user device is often effort intensive and largely based on guesswork. Additionally, determining the impact of including particular text content in a communication versus not including that text content in a communication is a technically challenging task, especially considering the complexities that arise when different text content is combined in a single communication.

SUMMARY

Certain aspects and features of the present disclosure relate to techniques for determining an impact of including one or more token-sets in communications transmitted to user devices. For example, a token can be any one or more words in an ordered sequence, such as a unigram (e.g., a single token), a bigram (e.g., two consecutive words), or a trigram (e.g., three consecutive words). A token-set can include a set of one or more tokens in an ordered sequence. A communication can be any digital communication (e.g., an email message, text message, or push notification) transmitted or configured for transmission to a target group of user devices over a communication channel. One or more token-sets can be included in a communication by, for example, providing the one or more token-sets in the subject line of an email message (or potentially in the "preview" lines of an email body). The impact of including a token-set in communications transmitted to user devices may refer to the impact on a target outcome or action, such as a user opening an email message to view the content or selecting a link within the content of the email message. For example, the positive impact of including a given token-set in a subject line of an email communication would result in an increased open rate. In some implementations, the impact on a target outcome of including a token-set in a communication can be determined using information from historical communications (e.g., the subject lines of email messages previously transmitted to user devices) and the associated target outcome of each historical communication (e.g., the open rate across the previously-transmitted email messages).

Certain techniques described herein relate to defining a group of token-sets and determining the impact on the target outcome for each token-set included in the group (e.g., a list of token-sets with their associated impact metrics). The determined impact on the target outcome for a given token-set can numerically represent the performance of that token-set. The performance of a given token-set is referred to herein as the composite performance parameter.

In some implementations, a group of token-sets can be identified from previously-transmitted communications. The group of token-sets may form a vocabulary of known or existing token-sets. A server can be configured to separate subject lines of the previously-transmitted communications into performance buckets. Each subject line can be characterized by an aggregated value that represents a historical performance associated with a target outcome (e.g., an open rate of a marketing email with a particular subject line). The server can bin each subject line into one of a plurality of performance buckets (e.g., high performing subject lines and low performing subject lines), such that the binning is based on the historical performance of the communications with the subject lines. For each token-set included in the group of token-sets, the server can generate an occurrence frequency of that token-set in each performance bucket. Then the server can generate the composite performance parameter for each token-set using the occurrence frequency determined for each performance bucket. The server can also generate a list of token-sets is an ordered list, such that the order of token-sets is based on the associated composite performance parameter of each token-set.

In some implementations, instead of binning the subject lines of communications into performance buckets, the server can determine the composite performance parameter for each token-set by generating, for example, an average performance of subject lines, in which that token-set is present. In some implementations the server can determine the composite performance parameter by, for example, determining a lift in average performance of subject lines, in which the token-set is absent versus the average performance of subject lines, in which the token-set is present.

Certain aspects of the present disclosure also relate to techniques for generating recommendations of token-sets to include in a new communication. For example, an interface may be provided to a user. The interface may enable the user to construct a new communication, which includes a subject line. A back-end server (e.g., a cloud server) can determine a group of token-sets and the associated composite performance parameter of each token-set included in the group. In some examples, the group of token-sets (or a portion thereof, such as a pruned list) and the associated composite performance parameters can be presented to the user on the interface, enabling the user to select high-performing token-sets (from the group of token-sets) to include in the new communication. In other examples, the back-end server can automatically cause a random (or pseudorandom) sampling of token-sets from the group of token-sets to be presented on the interface for the user to view. In other examples, the back-end server can select a stratified sampling from the group of token-sets. For example, the strata of token-sets can be based on the associated composite performance parameters of the various token-sets, and as such, a random sample of token-sets can be selected form a group of high-performing token-sets and another random sample of token-sets can be selected from another group of low-performing token-sets.

Certain aspects of the present disclosure also relate to techniques for determining an expected impact of a combination of various token-sets included in a new communication. In some implementations, a server can be configured to compute a combined performance parameter, which characterizes an estimation of the performance of the combination of the various known token-sets included in the new communication. For example, the server can extract a list of constituent token-sets from a subject line of the new communication. The server can then determine the combined performance score of the subject as an aggregation (e.g., average or median) of the composite performance parameters of each of the constituent token-sets.

Certain aspects of the present disclosure also relate to techniques for using a trained machine-learning model to generate an output, which is predictive of a composite performance parameter of a new token-set (e.g., one that is not included in a vocabulary of existing or known token-sets). In some implementations, if a subject line of a new communication is defined to include a new token-set (e.g., one which has not been previously transmitted to a user device), a machine-learning model can be trained to generate an output, which is predictive of the composite performance parameter associated with the new token-set (e.g., the performance of the new token-set with respect to the target outcome). A server can be configured to generate a feature vector to numerically represent the new token-set. The feature vector can be inputted into the trained machine-learning model. The trained machine-learning model can output a new composite performance parameter representing a prediction of the impact or the performance of that new token-set included in the new communication.

It will be appreciated that the present disclosure is not limited to subject lines included in communications. In some implementations, instead of communications being digital messages transmitted to user devices, any document can be defined as comprising one or more token-sets. The performance of each token-set (known in an existing vocabulary of token-sets or new to the existing vocabulary of token-sets) with respect to a target outcome (e.g., editing, saving, etc.) can be determined or predicted. It will also be appreciated that techniques described herein can be executed with non-text-tokens, such as images. It will also be appreciated that a composite performance parameter can be determined with respect to a category of token-sets (e.g., a campaign category, such as a certain type of product or service). In this case, to determine the composite performance parameter of a given token-set, only the historical communications associated with a particular category are considered. Additionally, if a new communication is defined, only the token-sets of a selected category will be used to provide token-set recommendations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented. The computer-implemented method also includes retrieving a set of text documents (e.g., subject lines of marketing emails) associated with a plurality of previous communications (e.g., emails of many past marketing campaigns), each text document of the set of text documents including one or more tokens (e.g., word(s) of a single subject line of a marketing email) characterizing a previous communication of the plurality of previous communications, and each previous communication of the plurality of previous communications having been interacted with by a recipient user device that received the previous communication (e.g., a user opening the marketing email or doing nothing with the marketing email, etc.). The computer-implemented method also includes identifying, for each text document of the set of text documents, a performance metric representing the aggregated value associated with the target outcome (e.g., opening a marketing email) performed by at least a subset of a set of recipient user devices that received the text document in a previous communication of the plurality of previous communications (e.g., the performance metric represents the subset of recipient users who opened the marketing email from a set of recipient users and represented as a percentage, such as an open rate). The computer-implemented method also includes generating a vocabulary of one or more token-sets from the set of text documents, each token-set of the one or more token-sets representing one or more tokens that are included in a same text document of the set of text documents (e.g., this could also include pairs of tokens or triplets of tokens occurring in the same text document). The computer-implemented method also includes generating, for each token-set of the one or more token-sets of the vocabulary, a composite performance parameter (e.g., a composite token-set score) representing an impact that the token-set has on a target outcome (e.g., the impact the token has on the open rate) associated with the plurality of previous communications. The computer-implemented method also includes generating an ordering (e.g., a ranking) for the one or more token-sets, the ordering being based on the composite performance parameter associated with each token-set of the one or more token-sets (e.g., ranking token sets based on their composite scores). Other embodiments of this aspect include corresponding computer systems, apparatus, and computer programs recorded on one or more computer storage devices, each configured to perform the actions of the methods.

Implementations may include one or more of the following features. The computer-implemented method where generating the composite performance parameter further includes: generating a lift parameter for each token-set of the one or more token-sets, the lift parameters representing an average performance of a first subset of the set of text documents as compared to an average performance of a second subset of the set of text documents, where each text document of the first subset of text documents includes the token-set associated with the lift parameter, and where each text document of the second subset of text documents does not include the token-set associated with the lift parameter. Generating the composite performance parameter further includes: identifying a subset of the set of text documents, each text document included in the subset corresponding to a previous communication that includes a particular token-set; and generating the composite performance parameter based on a combination (e.g., computing an average of) of the performance metric for each text document of the subset of text documents. Generating the composite performance parameter further includes: forming one or more subsets of the set of text documents, each subset of the one or more subsets corresponding to a range of the performance metric (e.g., separating subject lines into metric buckets of high, medium, and low performance); generating, for each token-set of the one or more token-sets, an occurrence parameter for each subset of the one or more subsets of the set of text documents, the occurrence parameter of a token-set for a given subset of text documents representing a prevalence of the token-set in the subset of text documents; identifying a particular token-set of the one or more token-sets; and for the particular token-set: identifying the occurrence parameter of the particular token-set for each subset of the one or more subsets of the set of text documents (e.g., calculating the proportion of subject lines that include the particular word(s) in the high-performing bucket, the proportion of subject lines that include the particular word(s) in the mid-performing bucket, and the proportion of subject lines that include the particular words in the low-performing bucket, etc.); and generating the composite performance parameter using an aggregation of the occurrence parameter of the particular token-set for each subset of the one or more subsets of the text documents (e.g., calculating the composite token-set score for the particular word(s) using any aggregation, including the logarithmic equation described in the disclosure documents this part of the specification will describe lots of different examples of calculations).

The computer-implemented method further including: receiving an input corresponding to an instruction to create a new communication, the new communication being configured to include a text document (e.g., creating a new marketing campaign that needs a yet-to-be-determined subject line for a marketing email); and selecting at least one token-set from amongst the one or more token-sets, the at least one selected token-set being selected as a recommendation to include as part of the text document of the new communication. Selecting the at least one token-set from amongst the ordered one or more token-sets further includes: presenting, on an interface, the one or more token-sets and the composite performance parameter associated with each token-set of the one or more token-sets, each of the one or more token-sets presented on the interface being selectable for including as part of the text document of the new communication. The computer-implemented method further including: receiving a new text document for a new communication, the new text document including one or more existing component token-sets that exist in the vocabulary; identifying, for each existing component token-set of the one or more existing composite token-sets included in the new text document, the composite performance parameter; and generating a new performance metric for the new text document, the new performance metric being based on a combination (e.g., average) of the composite performance parameter of each existing component token-set of the one or more existing component token-sets. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented. The computer-implemented method also includes identifying a new token-set including one or more tokens (e.g., this could also include pairs of tokens or triplets of tokens occurring in the same text document), each token of the one or more tokens including at least one word, the new token-set not being included in a vocabulary of a plurality of known token-sets, and each known token-set of the plurality of known token-sets being included in a text document (e.g., subject line) of a previous communication (e.g., marketing email) transmitted to a recipient use device; generating a new feature vector for the new token-set, the new feature vector being generated using one or more machine-learning techniques; inputting the new feature vector into a trained machine-learning model, the trained machine-learning model having been trained using a training data set including an existing feature vector and a composite performance parameter for each known token-set of the plurality of known token-sets, and where the composite performance parameter represents an impact of the text document with respect to a target outcome (e.g., impact of token-set on open rate determined using historical marketing emails); and generating, using the trained machine-learning model, an output predictive of a new composite performance parameter for the new token-set. Other embodiments of this aspect include corresponding computer systems, apparatus, and computer programs recorded on one or more computer storage devices, each configured to perform the actions of the methods.

Implementations may include one or more of the following features. The computer-implemented method where generating the new feature vector of the new token-set further includes: extracting one or more words from the new token-set; inputting each word of the one or more words of the new token-set into a word-to-vector model (e.g., Word2Vec); generating, as an output of the word-to-vector model, one or more word vectors for the new token-set, each word vector of the one or more word vectors numerically representing a word of the one or more words and having a defined length; and generating an aggregated vector representing an aggregation of the one or more word vectors of the new token-set, where the aggregated vector is the new feature vector for the new token-set. Generating the output using the trained machine-learning model further includes: generating an existing feature vector for one or more known token-sets of the plurality of known token-sets by inputting the one or more known words of the known token-set into a word-to-vector model; comparing the new feature vector representing the new token-set with the existing feature vectors of one or more of the plurality of known token-sets, the comparison being performed in a domain space (e.g., a Euclidean space) using a nearest neighbor technique; identifying one or more known token-sets, from amongst the plurality of known token-sets, that are similar to the new token-set, the similarity being determined based on a result of the comparison; and identifying a composite performance parameter for each known token-set of the one or more known token-sets that are similar to the new token-set; and generating a combination (e.g., an average) of the composite performance parameter for each known token-set of the one or more known token-sets that are similar to the new token-set, where the output of the trained machine-learning model is generated based on the generated combination. Generating the new feature vector for the new token-set further includes: extracting one or more words from the new token-set; inputting each word of the one or more words of the new token-set into a word-to-vector model (e.g., Word2Vec); generating, as an output of the word-to-vector model, one or more word vectors for the new token-set, each word vector of the one or more word vectors numerically representing a word of the one or more words and having a defined length; and generating a concatenated feature list including a concatenation of each word vector of the one or more word vectors, augmented with the number of tokens in the token-set, where the concatenation includes within-token-aggregation followed by concatenation or where the concatenation is performed across the one or more words of the new token-set, and the concatenated feature list numerically representing the new token-set and being used as the new feature vector for the new token-set. Generating the output using the trained machine-learning model further includes: generating an existing feature vector for one or more known token-set of the plurality of known token-sets by inputting the one or more known words of the known token-set into a word-to-vector model; performing a clustering operation on the existing feature vector for one or more known token-sets of the plurality of known token-sets; in response to performing the clustering operation, forming one or more clusters of existing feature vectors, each cluster of the one or more clusters being associated with one or more existing feature vectors; assigning the new feature vector to a cluster of the one or more clusters, the assignment being based on a comparison between the new feature vector and the centroids of the existing feature vectors of each cluster; identifying a composite performance parameter for each existing feature vector associated with the cluster assigned to the new feature vector; and generating a combined composite performance parameter based on a combination (e.g., an average) of the identified composite performance parameter for each existing feature vector associated with the cluster assigned to the new feature vector. Generating the output using the trained machine-learning model further includes: training the machine-learning model using a supervised machine-learning technique and the training data set, where the training data set includes an existing feature vector representing the known token-set and an existing composite performance parameter for one or more known token-sets of the plurality of known token-sets. Implementations of the described techniques may include hardware, a method or process, or computer software on a computer-accessible medium.

One general aspect includes the computer-implemented method of claim. The computer-implemented method also includes extracting one or more words from the new token-set. The computer-implemented method also includes inputting each word of the one or more words of the new token-set into a word-to-vector model (e.g., Word2Vec). The computer-implemented method also includes generating, as an output of the word-to-vector model, one or more word vectors for the new token-set, each word vector of the one or more word vectors being associated with a word of the one or more words and having a defined length. The computer-implemented method also includes generating a feature list to numerically represent the new token-set, the feature list being generated by concatenating the one or more word vectors for the new token-set, where the concatenation includes within-token-aggregation followed by concatenation or where the concatenation is performed across the one or more words of the new token-set. The computer-implemented method also includes training a tree-based supervised machine-learning model (e.g., a random forest model), where the tree-based supervised machine-learning model is trained based on an existing feature list for each known token-set of the plurality of known token-sets. The computer-implemented method also includes generating the output by inputting the feature list into the trained tree-based supervised machine-learning model. Other embodiments of this aspect include corresponding computer systems, apparatus, and computer programs recorded on one or more computer storage devices, each configured to perform the actions of the methods.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
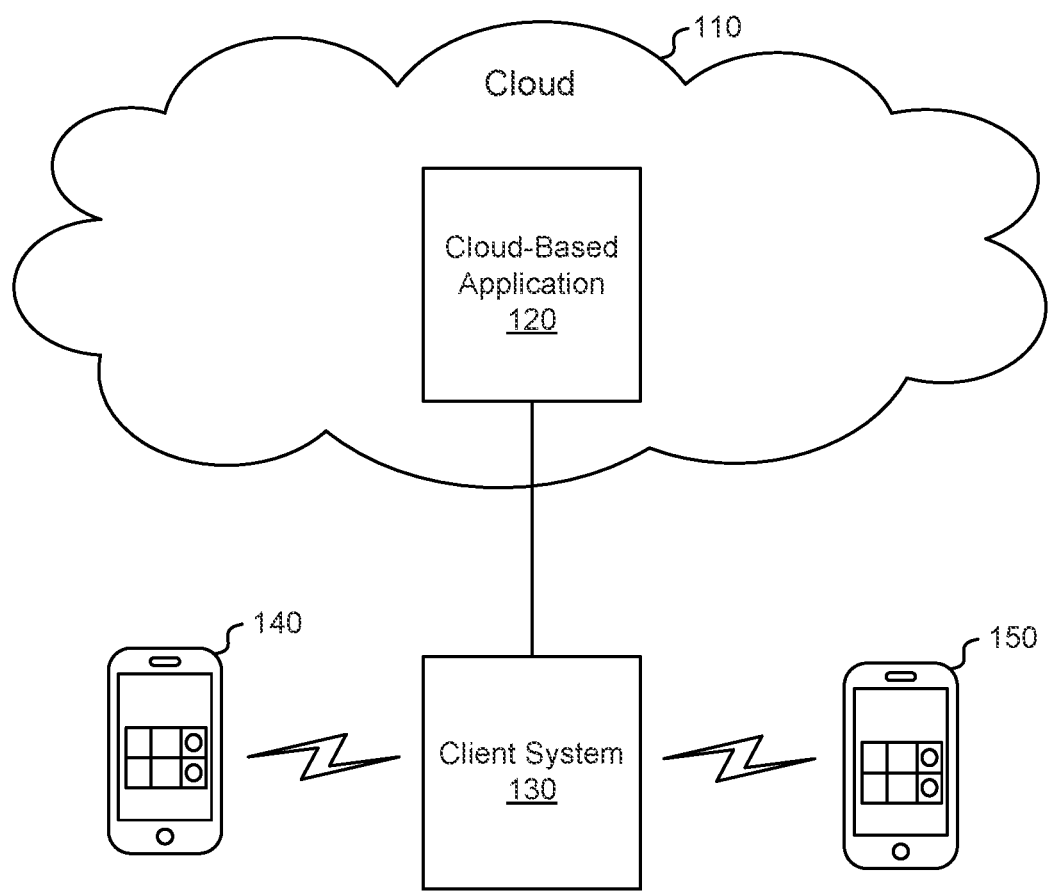
FIG. 1 is a block diagram illustrating an example of a network environment, according to some aspects of the present disclosure.

Cloud-based applications may include data management platforms hosted on cloud networks. Data management platforms may be configured to enable users to perform certain functionality on data records. For example, a data record may be a user profile that includes one or more data fields. A data field of a data record may include values that characterize a user associated with the user profile. The data field may be generated based on a previous interaction, such as an interaction between a user device and a communication (e.g., an email message). For example, if a user device receives a communication, and the user operating the user device selects the communication to view its content, one or more data fields in the data record may indicate that the communication was opened and viewed.

Communications can be transmitted by a cloud-based application (or in some cases, by one or more servers external to the cloud network) to a target group of user devices. As a non-limiting example, a communication may be a marketing email transmitted to a group of potential customers of a product or service. Non-limiting examples of a communication include a Short Message Service (SMS) message, email message, phone call, pop-up message while browsing a webpage, push notification, and other suitable types of digital communication.

The text content included in a communication that is transmitted to a target user device may have an impact on a target outcome, such as opening the communication to view its content. Accordingly, determining which specific text content to include in, for example, a subject line of an email, is largely based on subjective guesswork. Given the complexities and the scale of various combinations of text content that can potentially be included in a subject line of a communication, it is a technical challenge to represent the impact of specific text content on a target outcome (e.g., open rate) in a meaningful and understandable manner.

As a practical application, certain aspects and features of the present disclosure relate to techniques for determining the impact that a token-set has on a target outcome (e.g., causing an increase in open rate) when that token-set is included in a communication. The impact of a given token-set, which is referred to as a composite performance parameter herein, can be determined based on the subject lines of previously-transmitted communications and the outcomes associated with those previously-transmitted communications. The outcome associated with a communication can be, for example, an indication of whether the communication (e.g., an email) was opened by a user, whether a link included in the body text of the communication was selected, whether the communication was forwarded to another user device, whether a user responded to a communication, and other suitable outcomes. Certain aspects and features of the present disclosure also relate to techniques for using machine learning to generate an output that is predictive of a composite performance parameter for a new token-set that is not included in the vocabulary of known token-sets. The impact on the target outcome of including a particular token-set in a subject line of a communication can be represented numerically using techniques described herein. The numerical representation of the impact of a token-set can be used, for example, to recommend token-sets for a new communication or to estimate the impact of a new combination of existing token-sets. Thus, certain aspects and features of the present disclosure improve the technology of cloud-based data management platforms by enabling the platforms to automatically determine the impact of including certain text content (e.g., token-sets) in communications that are transmitted to user devices and to generate recommendations of token-sets to include when configuring a new communication that has not been transmitted to user devices yet.

FIG. 1 is a block diagram illustrating an example of a network environment 100 for processing data records using a data management platform, such as cloud-based application 120. Cloud network 110 may be any cloud-based network that includes one or more cloud-based servers and one or more cloud-based databases. The one or more cloud-based servers of cloud network 110 may include at least one application server that hosts cloud-based application 120, along with at least one database server. For example, cloud-based application 120 may be a data management platform configured to perform functionality associated with one or more data sets of data records. In some implementations, a data record may represent a user profile that includes one or more data fields. Each data field of the one or more data fields may include a value that was generated in response to a user device interacting with a native application or web server during a previous interaction. For example, when a user device receives a marketing email and opens the email using a native application, the native application can transmit a signal to cloud-based application 120 as an indication that the marketing email was opened. The cloud-based application 120 may extract one or more features (e.g., location of the user who opened the email) from the signal received at the cloud-based application 120. Various user features may be collected over time in a user profile.

The client system 130 may include a network of one or more servers and databases associated with a client (e.g., an entity, such as a company). In some implementations, the network within the client system 130 may include a web server that hosts one or more webpages or an application server that hosts a native application operated by or associated with the client. User device 140 may interact with the client system 130 by transmitting a communication to the web server of client system 130. For example, the communication may be a request to load a webpage onto a browser running on the user device 140. Similarly, user device 150 may transmit a communication to the client system 130 requesting to load the webpage on the browser of user device 150. It will be appreciated that any number of user devices and of any type of computing device (e.g., desktop computer, tablet computer, electronic kiosk, and so on) may communicate with client system 130.

In some implementations, client system 130 may access cloud-based application 120 to load an interface that enables a user associated with client system 130 to define communications (e.g., a marketer creating a marketing email message) to be transmitted to a target group of user devices. For example, the interface may enable a user to define the text content to include in the communications and the specific communication channel selected for transmitting the various communications. As an illustrative example, the interface may enable the user to define one or more token-sets to include in a subject line of a marketing email. After the communication is defined, the cloud-based application 120 can transmit the communication to a target group of users, for example, to engage certain target users. According to certain embodiments, cloud-based application 120 can generate recommendations of token-sets to present to the user as the user is configuring a new communication. The recommendation of a token-set may be provided to the user based on the composite performance parameter of the token-set. In other embodiments, the interface can present a list of token-sets, from which the user can select to include in the new communication.

In some implementations, cloud-based application 120 may construct a vocabulary of token-sets, and generate a composite performance parameter for each token-set from amongst the vocabulary of token-sets. The vocabulary of token-sets can be extracted from, for example, the subject lines of historical communications previously transmitted to user devices. In some implementations, cloud-based application 120 can generate the composite performance parameter for each token-set using a performance bucket approach, which is described in greater detail with respect to FIGS. 2-3. In other implementations, cloud-based application 120 can generate the composite performance parameter for each token-set using a performance based on the presence or absence of a token-set in a subject line of a previously-transmitted communication, which is described in greater detail with respect to FIGS. 2-3.

In some implementations, cloud-based application 120 may generate a prediction of a composite performance parameter for a new token-set (e.g., one that is not already included in the vocabulary). For example, cloud-based application 120 can execute a machine-learning model that is trained to predict the composite performance parameter of a new token-set, as described in greater detail with respect to FIG. 4.

In some implementations, cloud-based application 120 can generated outputs that serve as suggestions of token-completions for a subject line of a new communication. For example, cloud-based application 120 can generate an output that serves as a suggestion of the next two tokens that would complete a new partial subject line (e.g., a first token is provided by the user as a partial new subject line, and the cloud-based application 120 suggests the next two tokens to complete the new subject line. In some implementations, cloud-based application 120 can generate outputs that serve as suggestions of token-set completions. For example, cloud-based application 120 can generate outputs that serve as suggestions of which additional token or n-gram to include in a subject-line to complete a partial subject line (e.g., one or more token-sets) provided by the user.

In some implementations, client system 130 may access cloud-based application 120 to create, design, or generate a communication. For example, cloud-based application 120 may generate interface data that causes an interface to be displayed on an end user associated with client system 130. The interface may enable the user to define a subject lines including one or more token-sets and save the one or more token-sets as a communication (in addition to other data, such as the body of the communication). The cloud-based application 120 may generate an aggregated value representing a performance with respect to a target outcome of each communication. As an illustrative example, the target outcome may be an act by a recipient user device (e.g., a user device receiving the communication) of opening the email to view its content. Any suitable target outcome can be selected for this purpose.

Figure 2:
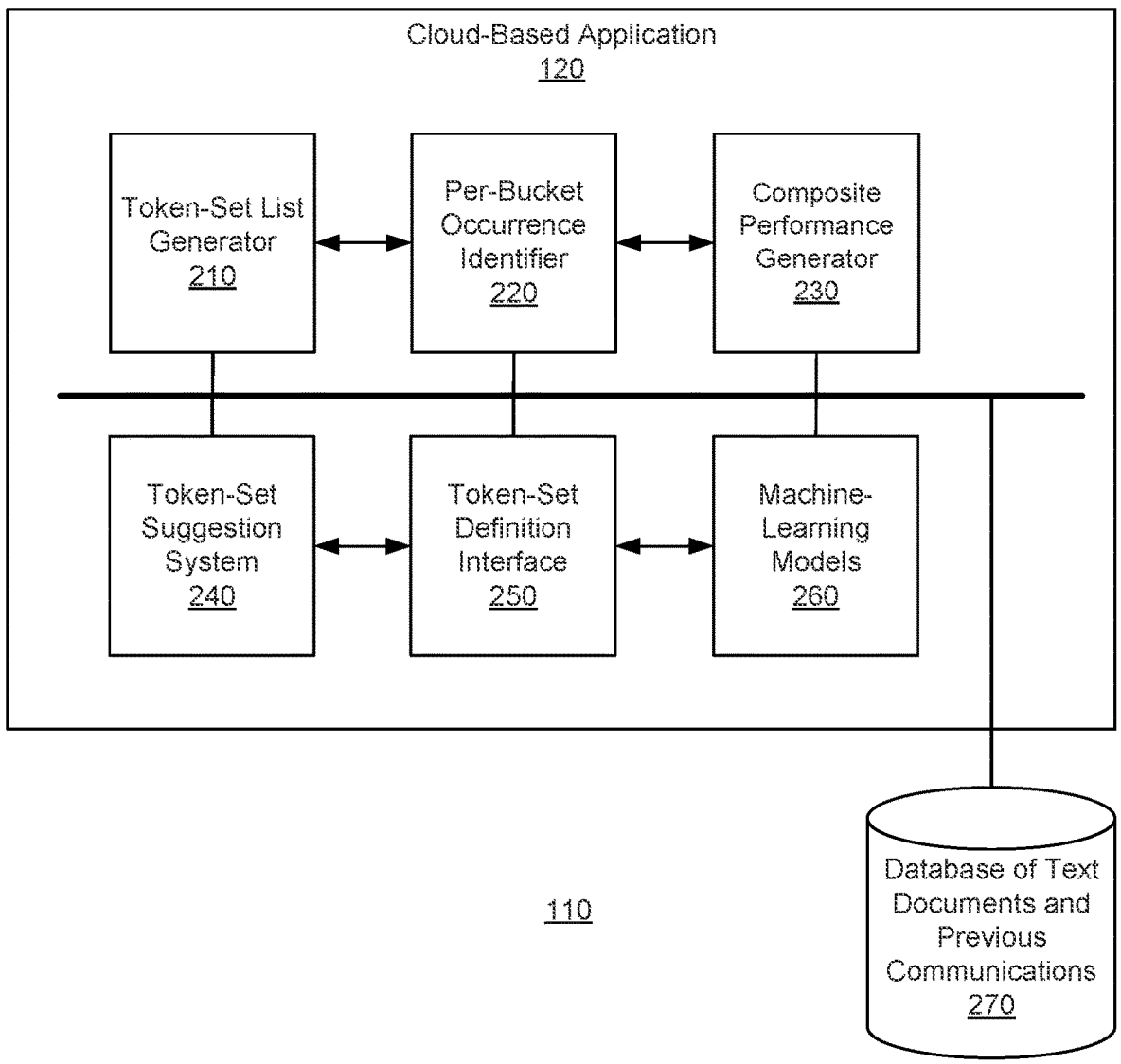
FIG. 2 is a block diagram illustrating another example of a network environment, according to some aspects of the present disclosure.

FIG. 2 is a block diagram illustrating another example of cloud network 110, according to some aspects of the present disclosure. Cloud-based application 120 may include a network of cloud-based servers and databases. In some implementations, the network of cloud-based application 120 may include token-set list generator 210, per-bucket occurrence identifier 220, composite performance generator 230, token-set suggestion system 240, token-set definition interface 250, and machine-learning models 260. Each of the components 210 through 260 may be implemented using executable code executed by a server, such as a cloud-based server. Additionally, each of the components 210 through 260 may retrieve information stored in database 270. For example, database 270 can store subject lines from historical communications, such as previously transmitted emails. It will be appreciated that subject lines are used herein merely as a non-limiting example of a text document usable with techniques described herein. The present disclosure is not limited to the use of subject lines of email messages, and thus, any other text document can be used herein, instead of or in addition to subject lines of email messages.

In some implementations, token-set list generator 210 may generate a vocabulary of token-sets from historical communications previously transmitted to user devices. For example, token-set list generator 210 may generate a list of token-sets (e.g., either single tokens or a collections of tokens, such as a token-set) present in a given set of subject lines of the historical communications. The list of token-sets includes each token-set that was included in a subject line of a previous communication.

Per-bucket occurrence identifier 220 may determine an aggregated value associated with each subject line of a previous communication. The aggregated value may represent a rate at which an outcome was achieved when the communication was received by a target group of user devices. Non-limiting examples of the outcome include open rate (e.g., the number of instances the communication with the subject line was opened divided by the size of the target group of user devices), click rate, conversion rate, view rate, share rate (e.g., the number of instances the communication with the subject line was shared, replied to, or forwarded to other user devices), and any other suitable outcome associated with a communication, such as an email. Per-bucket occurrence identifier 220 may separate the subject lines of historical communications into one or more performance buckets based on the aggregated values associated with the historical communications. As only a non-limiting example, per-bucket occurrence identifier 220 can separate existing subject lines into three buckets: one bucket for high performing subject lines (e.g., subject lines which are characterized by an open rate of above a threshold), one bucket for medium performing subject lines (e.g., subject lines which are characterized by an open rate of above a first threshold and also below a second threshold), and one bucket for low performing subject lines (e.g., subject lines which are characterized by an open rate of below a threshold).

Composite performance generator 230 can generate the composite performance parameter for each token-set included in the vocabulary of token-sets generated by token-set list generator 210. Composite performance generator 230 can determine an occurrence parameter for each token-set for each performance bucket. Continuing with the non-limiting example above where three performance buckets are defined, composite performance generator 230 can generate an occurrence parameter for a token-set for the high performing performance bucket, an occurrence parameter for that token-set for the medium performing performance bucket, and an occurrence parameter for that token-set for the low performing parameter. The occurrence parameter can represent the frequency of that token-set in subject lines across that group. Composite performance generator 230 can generate an occurrence parameter for each token-set in the vocabulary.

Additionally, composite performance generator 230 can generate the composite performance parameter for each token-set. In some implementations, composite performance generator 230 can determine a single score for each token-set. The score may be determined based on the principle that the token-set is a high-performing token-set (e.g., the token-set has a high correlation to a certain target outcome) if it occurs more frequently in the high-performing buckets while at the same time occurring less frequently in the low-performing buckets. As a non-limiting example, composite performance generator 230 can compute the composite score using the following equation:

$$\text{score}(T) = (w\_HM * \log(F\text{-high}/F\text{-medium})) + (w\_ML * \log(F\text{-medium}/F\text{-low})) + (w\_HL * \log(F\text{-high}/F\text{-low})) \quad \text{(Equation 1)}$$

Where each of w_HM, w_ML and w_HL are non-negative weights, the value of which is selected to ensure a high score only when the token-set is consistently more prevalent in the higher-performance-metric buckets. It will be appreciated that the present disclosure is not limited to executing Equation (1) to generate the composite performance parameter. Other techniques for computing the composite performance parameter may be used. In some implementations, the composite performance parameter is determined based on an average (or another aggregation of) per-bucket performance-metrics into the calculation of Equation (1).

In some implementations, instead of separating the subject lines of previous communications into performance buckets, composite performance generator 230 can generate the composite performance parameter for each token-set by determining an average performance (e.g., open rate) of subject lines, in which the token-set is present. In other implementations, composite performance generator 230 can generate the composite performance parameter by determining a lift in average performance of subject lines, in which the token-set is present as compared to subject lines, in which the token-set is absent. Given a token-set, T, the following equations are provided:

$$p0(T) = E(\text{open rate}|\text{token-set absent}) \quad \text{(Equation 2)}$$

$$p1(T) = E(\text{open rate}|\text{token-set present}) \quad \text{(Equation 3)}$$

where E( . . . ) represents an expected value. The following variants of a composite performance parameter for a given token-set based on p0(T) and p1(T):

$$\text{score\_1}(T) = p1(T) \quad \text{(Equation 4)}$$

$$\text{score\_2\_linear}(T) = p1(T)/p0(T) \quad \text{(Equation 5)}$$

$$\text{normalized\_score\_1}(T) = \text{score\_1}(T)/\max(\text{score\_1}(T), \text{over token-sets } T) \quad \text{(Equation 6)}$$

$$\text{normalized\_score\_2\_linear}(T) = \text{score\_2\_linear}(T)/\max \\ (\text{score\_2\_linear}(T), \text{over token-sets } T), \quad \text{(Equation 7)}$$

$$\text{normalized\_score\_2\_log}(T) = \text{score\_2\_log}(T)/\max(\text{abs} \\ (\text{score\_2\_log}(T), \text{over token-sets } T)), \quad \text{(Equation 8)}$$

In addition, raw and normalized scores can be defined as follows:

$$\text{score\_3}(T) = p1(T) - p0(T), \quad \text{(Equation 9)}$$

$$\text{score\_4}(T) = (p1(T) - p0(T))/p0(T) = \text{score\_2\_linear}(T) - 1.0, \quad \text{(Equation 10)}$$

$$\text{in general, norm1\_score}(T) = \text{raw\_score}(T)/\max(\text{abs} \\ (\text{raw\_score}(T)), \text{over token-sets } T), \quad \text{(Equation 11)}$$

$$\text{in general, norm2\_score}(T) = (\text{raw\_score}(T) - \min \\ (\text{raw\_score}(T)))/\text{range}(\text{raw\_score}(T)), \quad \text{(Equation 12)}$$

Token-set suggestion system 240 can be configured to identify one or more token-sets that would complete a partial subject line. In some implementations, token-set suggestion system 240 can use the vocabulary of token-sets and their associated scores to suggest one or more tokens that would complete a partial subject line (e.g., a single token). As an illustrative example, if a partial token in a subject line includes a partial trigram, in which the first two words are provided by the user and the last word has not yet been provided yet, then token-set suggestion system 240 can identify the third word that would complete the token. Token-set suggestion system 240 begins with the vocabulary of token-sets and their associated composite performance parameters, and identifies only a subset of token-sets containing single-token token-sets. Out of the subset, token-set suggestion system 240 extracts pairs of tokens and the corresponding composite performance parameters that are trigrams, such that the first two words of the trigram match the first two words of the partial token. Then, the subset is ranked in decreasing score order. The highest scoring pairs are selected as suggestions to complete the partial token. In some implementations, token-set suggestion system 240 can complete a partial token-set (e.g., token-set=(t1, t2, ?, ?)). Token-set suggestion system 240 provides a suggestion of token-sets that complete the partial token-set by identifying token-sets from the vocabulary that include the same number of tokens as the completed token-set, include the partial token-set, and that are associated with a compositing performance parameter that is above a threshold value.

Token-set definition interface 250 can facilitate loading an interface on a user device, such as user device 140. For example, the user device can access the interface to enable a user to define a subject line (or any other text document) of a new communication. The interface can present a list of token-sets and the associated composite performance parameter of the score. The interface may include, for example, one or more input elements that are configured to receive input, such as a token or token-set entered by a user.

Machine-learning models 260 may be any server, processor and/or database configured to generate, train, or execute a machine-learning or artificial intelligence model. For example, the machine-learning models may be generated using one or more machine-learning algorithms, such as an ensemble of multi-label classifiers (e.g., supervised or unsupervised learning), artificial neural networks (including backpropagation, Boltzmann machines, etc.), Bayesian statistics (e.g., Bayesian networks or knowledge bases), Learn-to-Rank techniques, logistical model trees, decision tree models, support vector machines, information fuzzy networks, Hidden Markov models, hierarchical clustering (unsupervised), self-organizing maps, clustering techniques, and other suitable machine-learning techniques (supervised, semi-supervised, or unsupervised).

In some implementations, machine-learning models 260 can include a feature vector generator that generates a feature vector to numerically represent a token or token-set. For example, U.S. Ser. No. 16/286,297, filed on Feb. 26, 2019, which is incorporated herein by reference in its entirety for all purposes, describes a process for generating a vector representing a task of a communication.

In some implementations, the feature vector generator may generate representations of the one or more words in a token included in a subject of a communication. As an illustrative example, for an email message, the feature vector generator may generate representations of various parameters of the email message. Parameters may include numerical and categorical variables of the metadata associated with the email (e.g., product-category, type-of-task, and so on). In this example, the representations of the email metadata may be left as-is, scaled, reduced in dimension, or processed in another manner. Parameters may also include the email subject-line and email body-text (or at least the preview line of the body of the email). In this case, natural language processing (NLP), term-frequency-matrix, term frequency-inverse document frequency (TF-IDF), topic modeling, and so on, may be executed to transform the text into a vector representation of the text. Parameters may also include email content (e.g., image data). In this case, feature vector generator may transform raw image vectors into task vectors using, for example, dimension-reduction techniques (e.g., non-negative matrix factorization, (NMF), singular value decomposition (SVD), principal component analysis (PCA), and other suitable techniques) or as intermediate outputs of a neural network.

In some implementations, machine-learning models 260 include a trained machine-learning model that is trained to generate an output, which is predictive of a composite performance parameter of a new token-set (e.g., one that is not included in a vocabulary of existing or known token-sets). In some implementations, if a subject line of a new communication is defined to include a new token-set (e.g., one which has not been previously transmitted to a user device), a machine-learning model can be trained to generate an output, which is predictive of the composite performance parameter associated with the new token-set (e.g., the performance of the new token-set with respect to the target outcome). A server can be configured to generate a feature vector to numerically represent the new token-set. The feature vector can be inputted into the trained machine-learning model. The trained machine-learning model can output a new composite performance parameter representing a prediction of the impact or the performance of that new token-set included in the new communication.

In some implementations, machine-learning models 260 generates one or more machine-learning features for each token-set. For example, the machine-learning features can be based on the Word2Vec vector (or similar word-to-vector techniques) of the tokens in the token-set. If a token-set includes N tokens (t1, t2, . . . , tN), where t1, . . . tN are the individual tokens in the token-set, then in some implementations, machine-learning models 260 can generate a single feature vector V of length P. Machine-learning models 260 can compute the Word2Vec vectors V1, V2, VN (each of length P), respectively, for each of the tokens t1, t2, . . . tN. For a unigram token, machine-learning models 260 may execute a Word2Vec vector to numerically represent the token. For a bigram token, machine-learning models 260 may aggregate (e.g., compute an average) the Word2Vec vectors (of length P) of each of the two words of the bigram token, and so on. Machine-learning models 260 can aggregate (e.g., compute the average) the length-P Word2Vec vectors (e.g., V1, V2, . . . VN) to form the length-P feature vector, V. In other implementations, machine-learning models 260 can generate a list of machine-learning features by computing length-P Word2Vec vectors (e.g., V1=(V11, V12, . . . , V1P), V2=(V21, V22, . . . , V2P), and so on). Machine-learning models 260 can form the list of machine-learning features by concatenating the length-P Word2Vec vectors (e.g., as in L=(N, V11, V12, . . . , V1P, V21, V22, . . . , V2P, . . . , VN1, VN2, . . . , VNP)).

Machine-learning models 260 can evaluate the machine-learning features generated using techniques described above, and use the resulting machine-learning features as a training data set to train machine-learning algorithms that can predict the composite performance parameter of a new token-set (e.g., one that is not included in the vocabulary). Machine-learning models 260 can perform a k-nearest-neighbors analysis by predicting the composite performance parameter of a new token. The predicting also includes computing average(scores(K token-sets in training-set {MLF(T)=V, score(T)} that are most similar to the new token-set based on the machine-learning features of the new token-set)). In other examples, machine-learning models 260 can perform a clustering operation on the training-set token-sets, based on the machine-learning features of token-sets described above. Machine-learning models 260 can assign the new token-set to one of the pre-computed clusters based on the machine-learning features. Machine-learning model 260 can then predict a new composite performance parameter based on the following equation: average(scores (training token-sets within the above assigned cluster)). In some implementations, machine-learning models 260 can include a supervised-learning model, which is built as a predictive model based on the pair of machine-learning features and the corresponding composite performance parameters. The supervised-learning model can generate outputs predictive of the composite performance parameter of a new token-set that is not included in the vocabulary. In some implementations, machine-learning models 260 can include a tree-based model (e.g., a decision tree, random-forest, etc.) that is trained using the machine-learning feature and composite performance parameter of each token-set included in the vocabulary. The tree-based model can receive as input a new token or token-set and generate as output a new composite performance parameter to predict the performance of the new token or token-set on a target outcome. The new token or new token-set may not be included in the vocabulary.

Figure 3:
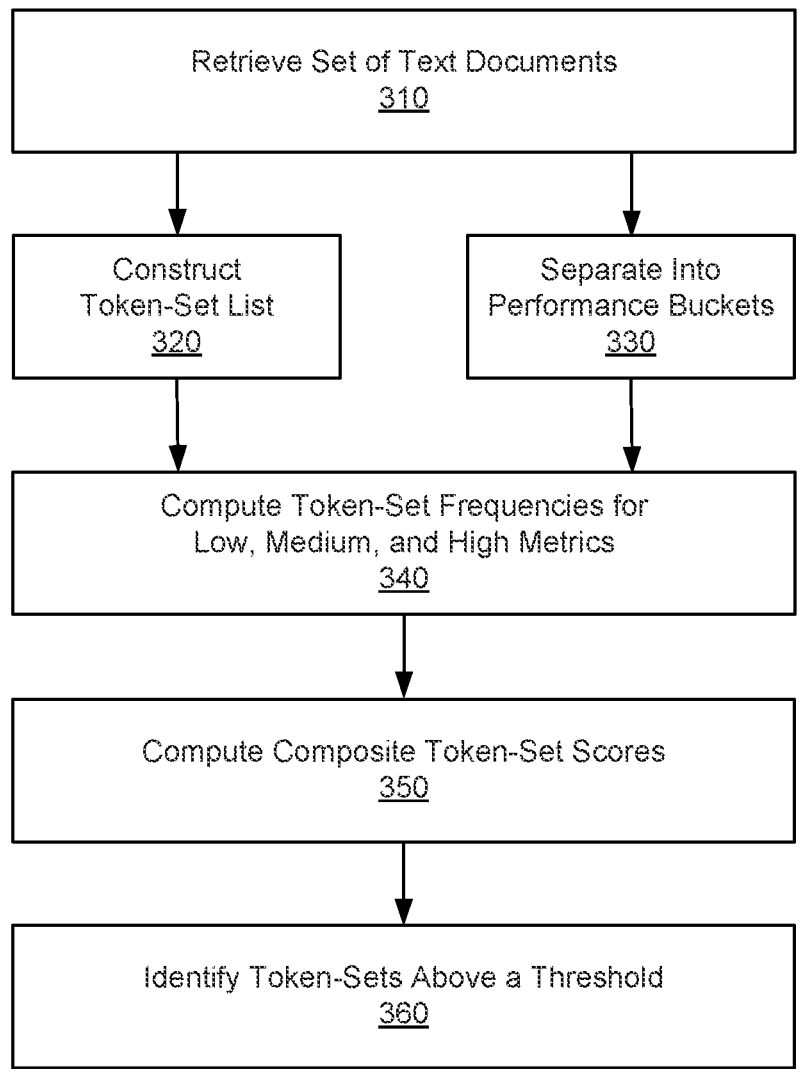
FIG. 3 illustrates an example of a process flow for determining the composite performance parameter for each token-set of a group of token-sets, according to some aspects of the present disclosure.

FIG. 3 is a diagram illustrating an example of a process flow 300 for generating a composite performance parameter to numerically represent the impact on a target outcome of including a token-set in the subject line of a communication. Process flow 300 may be performed, at least in part, by any component described in FIGS. 1-2, for example.

Process flow 300 may begin at block 310 where cloud-based application 120 retrieves a set of text documents. A text document, for example, refers to a subject line of an email message (or potentially the preview line of the email body) or any other document that includes text. Text may be represented in the form of tokens or token-sets. The set of text documents may include subject lines of email messages that were previously transmitted to a group of target user devices.

At block 320, cloud-based application 120 may generate a token-set list (e.g., a vocabulary of token-sets) from historical communications previously transmitted to user devices. For example, token-set list generator 210 may generate a list of token-sets (e.g., either single tokens or a collections of tokens, such as a token-set) present in a given set of subject lines of the historical communications. The list of token-sets includes each token-set that was included in a subject line of a previous communication.

At block 330, cloud-based application 120 may separate the set of text documents into two or more subsets of text documents. Each subset of text documents may refer to a performance bucket. For example, if a particular subject line is associated with an open rate of above a threshold value, then per-bucket occurrence identifier 220 can assign the particular subject line to a high-performing group. Thus, separating the set of text documents into subsets of text documents is based on the aggregated value (e.g., open rates) of the text documents.

At block 340, cloud-based application 120 can generate an occurrence frequency of that token-set in each performance bucket. For example, for a given token-set, an occurrence frequency of a performance bucket can refer to a percentage of subject lines that include the token-set from a group of all the subject lines assigned to the performance bucket. Cloud-based application 120 can generate the composite performance parameter for each token-set using the occurrence frequency determined for each performance bucket. Cloud-based application can also generate a list of token-sets is an ordered list, such that the order of token-sets is based on the associated composite performance parameter of each token-set.

At block 350, cloud-based application 120 can compute a composite performance parameter for each token-set included in the vocabulary. In some implementations, cloud-based application 120 can execute Equation (1), shown above, to generate the composite performance parameter for a given token-set included in the vocabulary. The composite performance parameter can represent a single, numerical score characterizing the impact of include the token-set in the subject line of a communication, such as an email communication. The composite performance parameter may be determined based on the principle that the token-set is a high-performing token-set (e.g., the token-set has a high correlation to a certain target outcome) if it occurs more frequently in the high-performing buckets while at the same time occurring less frequently in the low-performing buckets.

At block 360, cloud-based application 120 can identify token-sets for which the corresponding composite performance parameters are above a threshold. Cloud-based application 120 can also present the identified token-sets to a user on an interface as recommended token-sets to include in new communications.

Figure 4:
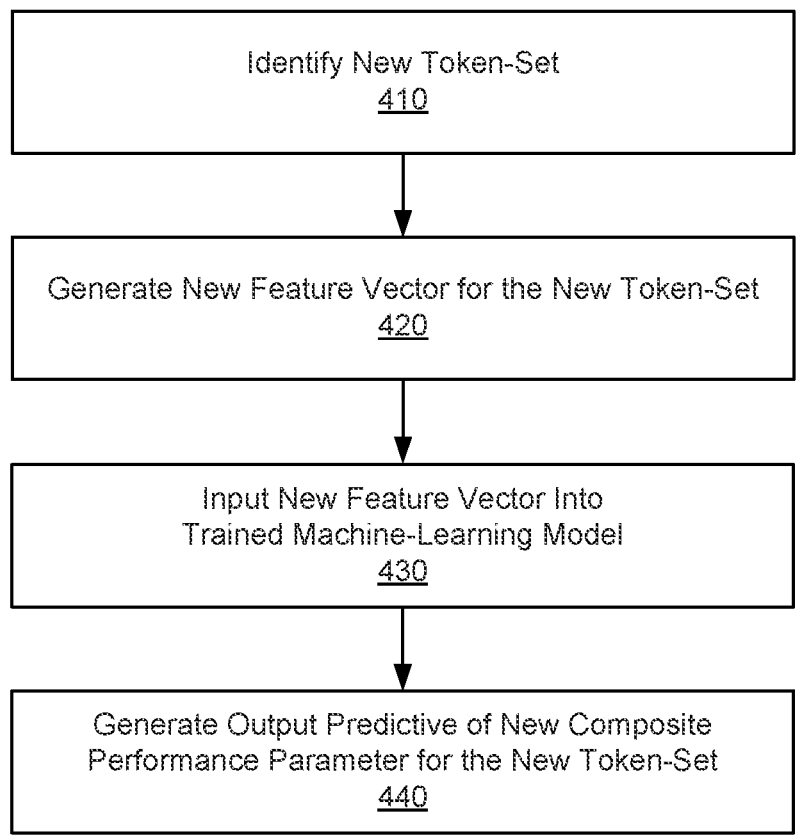
FIG. 4 illustrates an example of a process flow for generating a prediction of a combined performance parameter of a new combination of token-sets included in a new communication, according to some aspects of the present disclosure.

FIG. 4 is a diagram illustrating an example of a process flow 400 for generating predictions of composite performance parameters for newly-defined tokens, which do not exist in the vocabulary. Process flow 400 may be performed, at least in part, by any component described in FIGS. 1-2, for example.

Process flow 400 may begin at block 410 where cloud-based application 120 receives as input a new token-set, which is not included in the vocabulary. For example, the new token-set can include one or more tokens (e.g., a sequence of words) or token-sets (e.g., a sequence of a sequence of words). Each token of the one or more tokens may include at least one word. The new token-set may not be included in a vocabulary of a plurality of known token-sets. Each known token-set of the plurality of known token-sets may be included in a text document (e.g., subject line) of a previous communication (e.g., marketing email) transmitted to a recipient use device.

At block 420, cloud-based application 120 can generate a new feature vector for the new token-set. The new feature vector may be generated using one or more machine-learning techniques. As a non-limiting example, the token may be inputted into a Word2Vec model to generate a word vector for the token.

At block 430, cloud-based application 120 can input the new feature vector of the new token-set into a trained machine-learning model. The trained machine-learning model may be trained using a training data set including an existing feature vector and a composite performance parameter for each known token-set of the vocabulary of token-sets. The composite performance parameter for each known token-set can be determined using Equation (1) above. For example, cloud-based application 120 can separate subject lines of previous communications into different performance buckets. The performance of a subject line can refer to, for example, the open rate associated with the communications with that subject line. Cloud-based application 120 can generate the occurrence frequency for each token-set across each performance bucket. Cloud-based application 120 can execute Equation (1) to generate the composite performance parameter for a given token-set using the occurrence frequency of each performance bucket.

At block 440, cloud-based application 120 can generate, using the trained machine-learning model, an output predictive of a new composite performance parameter for the new token-set.

It will be appreciated that cloud-based application 120 generates a list of each token-set and the composite performance parameter associated with the token-set. The list of each token-set and the composite performance parameter can be used a supervised learning training data set. In the training data set, the composite performance parameters may be known labels. Cloud-based application 120 can generate machine-learning feature vectors for each token-set included in the list of token-sets without blurring the information that averaging Word2Vec vectors will create. As an illustrative example, token-set T may include (t1, t2, ... tN) and the constituent tokens t1, t2, ... are unigrams (e.g., single words) with associated length-P Word2Vec vectors V1, V2, .... Then, the machine-learning features of the token-set T can be defined as the concatenation of the constituent vectors (V1, V2, ..., VN). If a variable number N of tokens per token-set can be handled in two ways so that one still has fixed-length ML feature-vectors for model development. For instance, cloud-based application 120 can fix a maximum number of tokens per token-set, and if the number of tokens is smaller, the "other slots" may have "empty tokens" that are assigned a zero-valued vector of length P. Alternatively, cloud-based application 120 can develop separate models for single-token token-sets, for token-pairs, for token-triplets, and so on. It will also be appreciated that, given a token-set, cloud-based application 120 can average the Word2Vec vectors to get the constituent-token feature-vectors while concatenating for the overall token-set feature vector. In some implementations, cloud-based application 120 can concatenate for the constituent-tokens while averaging for the token-set.

Figure 5:
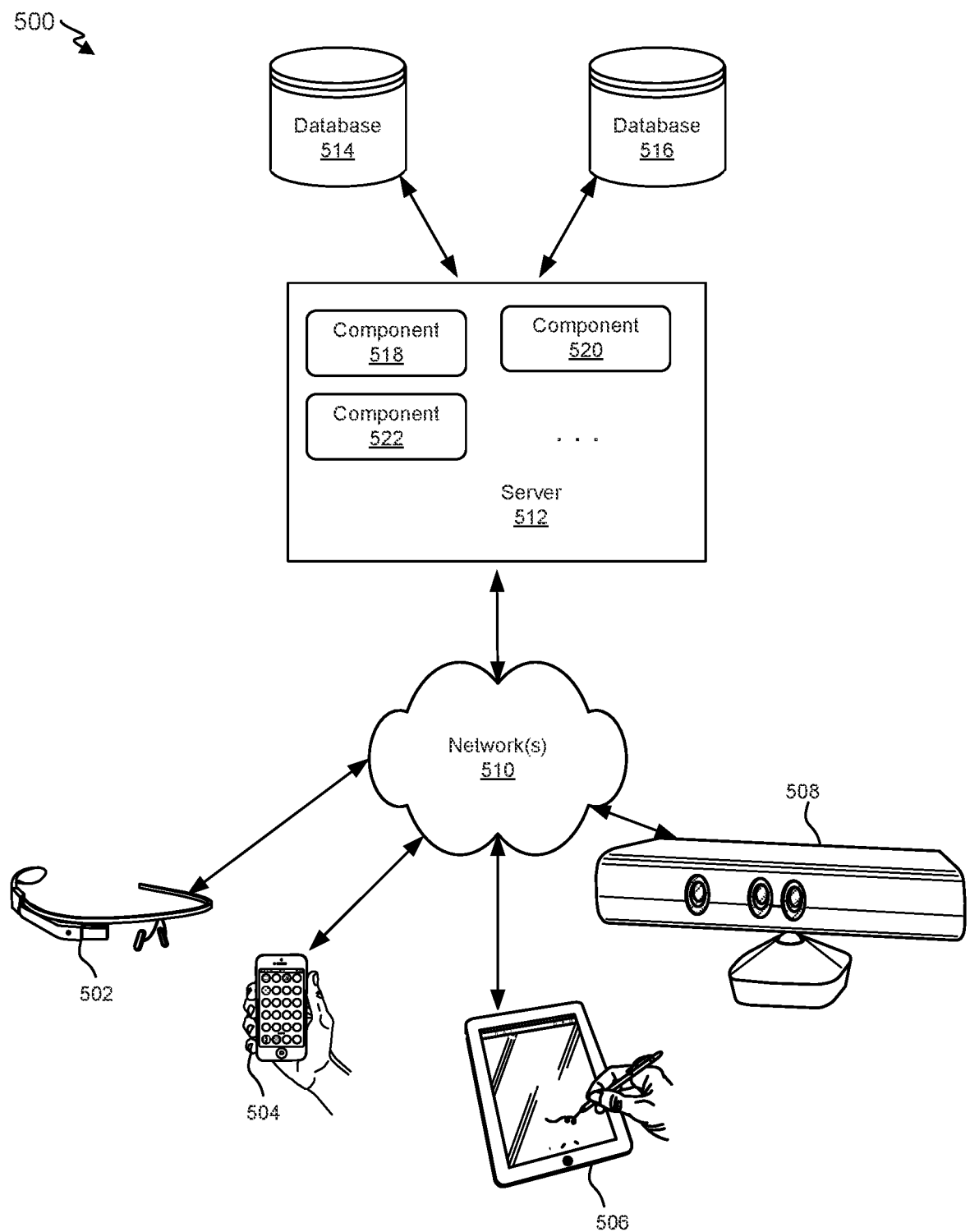
FIG. 5 is a simplified diagram illustrating a distributed system for implementing one of the embodiments.

FIG. 5 depicts a simplified diagram of a distributed system 500 for implementing one of the embodiments. In the illustrated embodiment, distributed system 500 includes one or more client computing devices 502, 504, 506, and 508, which are configured to execute and operate a client application such as a web browser, proprietary client (e.g., Oracle Forms), or the like over one or more network(s) 510. Server 512 may be communicatively coupled with remote client computing devices 502, 504, 506, and 508 via network 510.

In various embodiments, server 512 may be adapted to run one or more services or software applications provided by one or more of the components of the system. In some embodiments, these services may be offered as web-based or cloud services or under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in the figure, the software components 518, 520 and 522 of system 500 are shown as being implemented on server 512. In other embodiments, one or more of the components of system 500 and/or the services provided by these components may also be implemented by one or more of the client computing devices 502, 504, 506, and/or 508. Users operating the client computing devices may then utilize one or more client applications to use the services provided by these components. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

Client computing devices 502, 504, 506, and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 502, 504, 506, and 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with four client computing devices, any number of client computing devices may be supported. Other devices, such as devices with sensors, etc., may interact with server 512.

Network(s) 510 in distributed system 500 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands.

Figure 6:
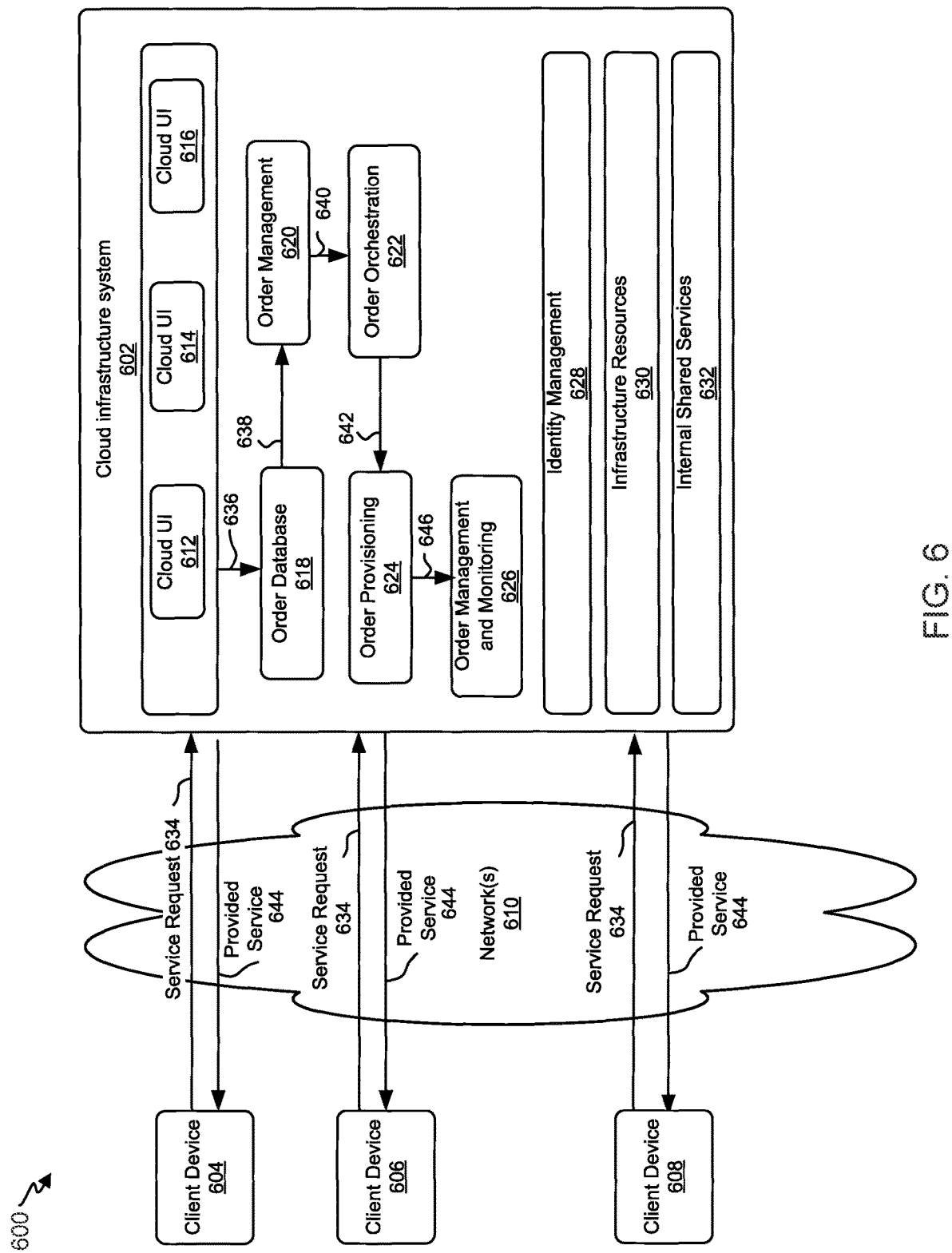
FIG. 6 is a simplified block diagram illustrating one or more components of a system environment.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more client computing devices 604, 606, and 608 that may be used by users to interact with a cloud infrastructure system 602 that provides cloud services. The client computing devices may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

Client computing devices 604, 606, and 608 may be devices similar to those described above for 502, 504, 506, and 508.

Although exemplary system environment 600 is shown with three client computing devices, any number of client computing devices may be supported. Other devices such as devices with sensors, etc. may interact with cloud infrastructure system 602.

Network(s) 610 may facilitate communications and exchange of data between clients 604, 606, and 608 and cloud infrastructure system 602. Each network may be any type of network familiar to those skilled in the art that can support data communications using any of a variety of commercially-available protocols, including those described above for network(s) 510.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In some embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to customers of the cloud infrastructure system. In one embodiment, infrastructure resources 630 may include pre-integrated and optimized combinations of hardware, such as servers, storage, and networking resources to execute the services provided by the PaaS platform and the SaaS platform.

In some embodiments, resources in cloud infrastructure system 602 may be shared by multiple users and dynamically re-allocated per demand. Additionally, resources may be allocated to users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 602, and the like.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a customer using a client device, such as client device 604, 606 or 608, may interact with cloud infrastructure system 602 by requesting one or more services provided by cloud infrastructure system 602 and placing an order for a subscription for one or more services offered by cloud infrastructure system 602. In certain embodiments, the customer may access a cloud User Interface (UI), cloud UI 612, cloud UI 614 and/or cloud UI 616 and place a subscription order via these UIs. The order information received by cloud infrastructure system 802 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of processes associated with each order and applies logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to customers on client devices 604, 606 and/or 608 by order provisioning module 624 of cloud infrastructure system 602.

At operation 646, the customer's subscription order may be managed and tracked by an order management and monitoring module 626. In some instances, order management and monitoring module 626 may be configured to collect usage statistics for the services in the subscription order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In some embodiments, identity management module 628 may control information about customers who wish to utilize the services provided by cloud infrastructure system 602. Such information can include information that authenticates the identities of such customers and information that describes which actions those customers are authorized to perform relative to various system resources (e.g., files, directories, applications, communication ports, memory segments, etc.) Identity management module 628 may also include the management of descriptive information about each customer and about how and by whom that descriptive information can be accessed and modified.

Figure 7:
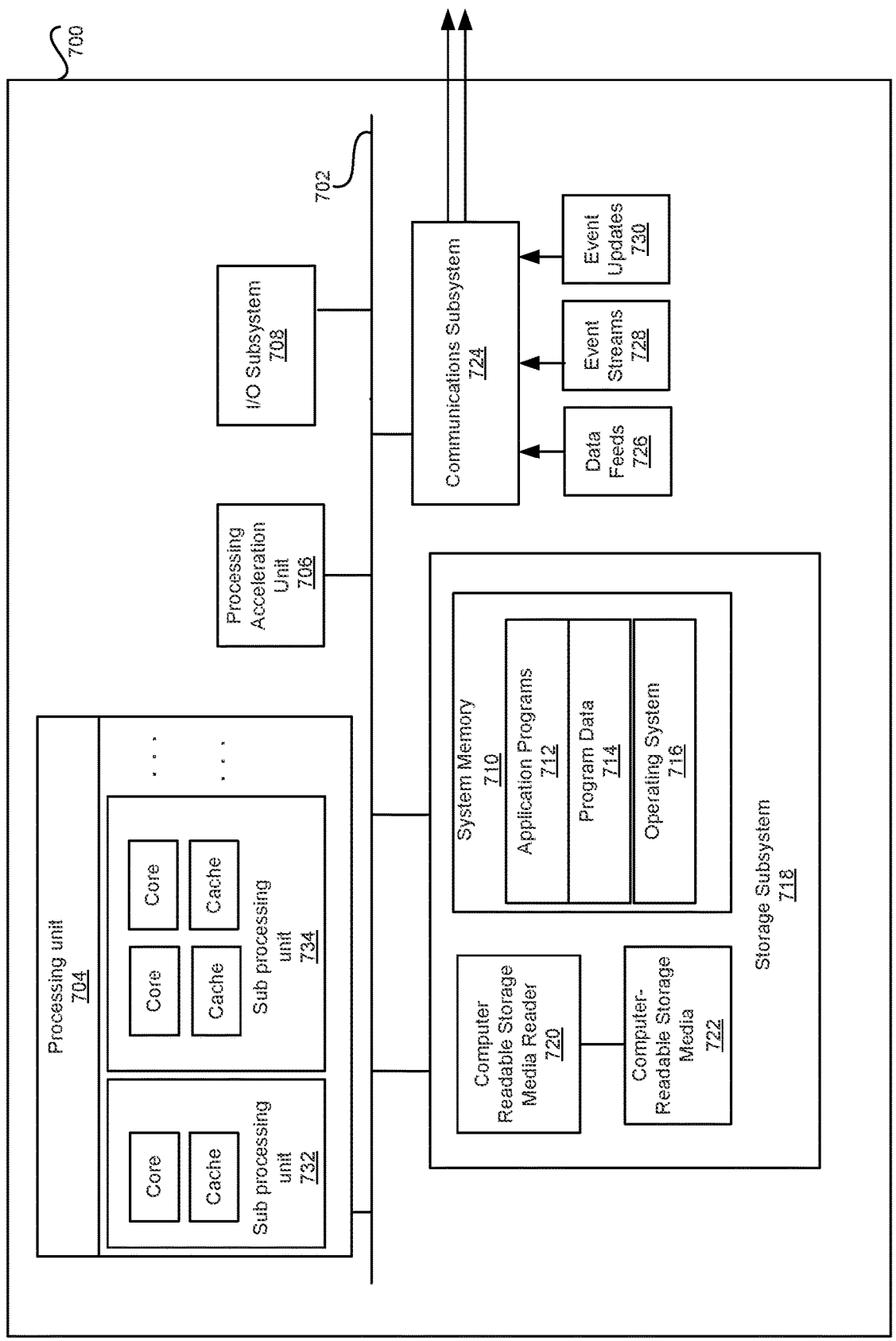
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 718 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 624 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
retrieving a set of text documents associated with a plurality of previous communications, each text document of the set of text documents including one or more tokens characterizing a previous communication of the plurality of previous communications, and each previous communication of the plurality of previous communications having been interacted with by a recipient user device that received the previous communication;
identifying, for each text document of the set of text documents, a performance metric representing an aggregated value associated with a target outcome performed by at least a subset of a set of recipient user devices that received the text document in a previous communication of the plurality of previous communications;
identifying, for each new token-set of one or more new token-sets and using a trained artificial-intelligence algorithm, a predicted composite performance parameter representing a predicted impact that the new token-set would have on the target outcome, wherein each new token set of the one or more new token-set was not represented in the set of text documents;
generating a vocabulary of one or more token-sets from the set of text documents and of the one or more new token-sets, wherein each of at least one token-set of the one or more token-sets represents an ordered combination of tokens that are included in a same text document of the set of text documents;

generating, for each token-set of the one or more token-sets of the vocabulary and for each new token-set of the one or more new token-sets, a composite performance parameter representing an impact or predicted impact that the token-set or the new token-set has on the target outcome associated with the plurality of previous communications, wherein generating the composite performance parameter further comprises:
  forming one or more subsets of the set of text documents, each subset of the one or more subsets corresponding to a range of the performance metric;
  generating, for each token-set of the one or more token-sets, an occurrence parameter for each subset of the one or more subsets of the set of text documents, the occurrence parameter of a token-set for a given subset of text documents representing a prevalence of the token-set in the subset of text documents;
  identifying a particular token-set of the one or more token-sets; and
  for the particular token-set:
    identifying the occurrence parameter of the particular token-set for each subset of the one or more subsets of the set of text documents; and
    generating the composite performance parameter using an aggregation of the occurrence parameter of the particular token-set for each subset of the one or more subsets of the text documents;
  generating an ordering for the one or more token-sets and the one or more new token-sets, the ordering being based on the composite performance parameter associated with each token-set of the one or more token-sets and each new token set of the one or more token sets; and
  outputting a result corresponding to the ordering, wherein the result corresponds to a suggestion of a completion of a portion of a set of text, wherein the portion of a set of text was defined by input from a client device.

2. The computer-implemented method of claim 1, wherein generating the composite performance parameter further comprises:
  generating a lift parameter for each token-set of the one or more token-sets, the lift parameters representing an average performance of a first subset of the set of text documents as compared to an average performance of a second subset of the set of text documents, wherein each text document of the first subset of text documents includes the token-set associated with the lift parameter, and wherein each text document of the second subset of text documents does not include the token-set associated with the lift parameter.

3. The computer-implemented method of claim 1, wherein generating the composite performance parameter further comprises:
  identifying a subset of the set of text documents, each text document included in the subset corresponding to a previous communication that includes a particular token-set; and
  generating the composite performance parameter based on a combination of the performance metric for each text document of the subset of text documents.

4. The computer-implemented method of claim 1, wherein generating the composite performance parameter further comprises:
  forming one or more subsets of the set of text documents, each subset of the one or more subsets corresponding to a range of the performance metric;
  generating, for each token-set of the one or more token-sets, an occurrence parameter for each subset of the one or more subsets of the set of text documents, the occurrence parameter of a token-set for a given subset of text documents representing a prevalence of the token-set in the subset of text documents;
  identifying a particular token-set of the one or more token-sets; and
  for the particular token-set:
    identifying the occurrence parameter of the particular token-set for each subset of the one or more subsets of the set of text documents; and
    generating the composite performance parameter using an aggregation of the occurrence parameter of the particular token-set for each subset of the one or more subsets of the text documents.

5. The computer-implemented method of claim 1, further comprising:
  receiving an input corresponding to an instruction to create a new communication, the new communication being configured to include a text document; and
  selecting at least one token-set from amongst the one or more token-sets, the at least one selected token-set being selected as a recommendation to include as part of the text document of the new communication.

6. The computer-implemented method of claim 5, wherein selecting the at least one token-set from amongst the ordered one or more token-sets further comprises:
  presenting, on an interface, the one or more token-sets and the composite performance parameter associated with each token-set of the one or more token-sets, each of the one or more token-sets presented on the interface being selectable for including as part of the text document of the new communication.

7. The computer-implemented method of claim 1, further comprising:
  receiving a new text document for a new communication, the new text document including one or more existing component token-sets that exist in the vocabulary;
  identifying, for each existing component token-set of the one or more existing composite token-sets included in the new text document, the composite performance parameter; and
  generating a new performance metric for the new text document, the new performance metric being based on a combination of the composite performance parameter of each existing component token-set of the one or more existing component token-sets.

8. A system, comprising:
  one or more processors; and
  a non-transitory computer-readable storage medium containing instructions which, when executed on the one or more processors, cause the one or more processors to perform operations including:
    retrieving a set of text documents associated with a plurality of previous communications, each text document of the set of text documents including one or more tokens characterizing a previous communication of the plurality of previous communications, and each previous communication of the plurality of previous communications having been interacted with by a recipient user device that received the previous communication;
    identifying, for each text document of the set of text documents, a performance metric representing an aggregated value associated with a target outcome performed by at least a subset of a set of recipient user devices that received the text document in a previous communication of the plurality of previous communications;

identifying, for each new token-set of one or more new token-sets and using a trained artificial-intelligence algorithm, a predicted composite performance parameter representing a predicted impact that the new token-set would have on the target outcome, wherein each new token set of the one or more new token-set was not represented in the set of text documents;

generating a vocabulary of one or more token-sets from the set of text documents and of the one or more new token-sets, wherein each of at least one token-set of the one or more token-sets represents an ordered combination of tokens that are included in a same text document of the set of text documents;

generating, for each token-set of the one or more token-sets of the vocabulary and for each new token-set of the one or more new token-sets, a composite performance parameter representing an impact or predicted impact that the token-set or the new token-set has on the target outcome associated with the plurality of previous communications, wherein generating the composite performance parameter further comprises:

forming one or more subsets of the set of text documents, each subset of the one or more subsets corresponding to a range of the performance metric;

generating, for each token-set of the one or more token-sets, an occurrence parameter for each subset of the one or more subsets of the set of text documents, the occurrence parameter of a token-set for a given subset of text documents representing a prevalence of the token-set in the subset of text documents;

identifying a particular token-set of the one or more token-sets; and for the particular token-set:
identifying the occurrence parameter of the particular token-set for each subset of the one or more subsets of the set of text documents; and generating the composite performance parameter using an aggregation of the occurrence parameter of the particular token-set for each subset of the one or more subsets of the text documents;

generating an ordering for the one or more token-sets and the one or more new token-sets, the ordering being based on the composite performance parameter associated with each token-set of the one or more token-sets and each new token set of the one or more token sets; and outputting a result corresponding to the ordering, wherein the result corresponds to a suggestion of a completion of a portion of a set of text, wherein the portion of a set of text was defined by input from a client device.

9. The system of claim 8, wherein generating the composite performance parameter further comprises:
generating a lift parameter for each token-set of the one or more token-sets, the lift parameters representing an average performance of a first subset of the set of text documents as compared to an average performance of a second subset of the set of text documents, wherein each text document of the first subset of text documents includes the token-set associated with the lift parameter, and wherein each text document of the second subset of text documents does not include the token-set associated with the lift parameter.

10. The system of claim 8, wherein generating the composite performance parameter further comprises:
identifying a subset of the set of text documents, each text document included in the subset corresponding to a previous communication that includes a particular token-set; and
generating the composite performance parameter based on a combination of the performance metric for each text document of the subset of text documents.

11. The system of claim 8, wherein generating the composite performance parameter further comprises:
forming one or more subsets of the set of text documents, each subset of the one or more subsets corresponding to a range of the performance metric;
generating, for each token-set of the one or more token-sets, an occurrence parameter for each subset of the one or more subsets of the set of text documents, the occurrence parameter of a token-set for a given subset of text documents representing a prevalence of the token-set in the subset of text documents;
identifying a particular token-set of the one or more token-sets; and
for the particular token-set:
identifying the occurrence parameter of the particular token-set for each subset of the one or more subsets of the set of text documents; and
generating the composite performance parameter using an aggregation of the occurrence parameter of the particular token-set for each subset of the one or more subsets of the text documents.

12. The system of claim 8, wherein the operations further comprise:
receiving an input corresponding to an instruction to create a new communication, the new communication being configured to include a text document; and
selecting at least one token-set from amongst the one or more token-sets, the at least one selected token-set being selected as a recommendation to include as part of the text document of the new communication.

13. The system of claim 12, wherein selecting the at least one token-set from amongst the ordered one or more token-sets further comprises:
presenting, on an interface, the one or more token-sets and the composite performance parameter associated with each token-set of the one or more token-sets, each of the one or more token-sets presented on the interface being selectable for including as part of the text document of the new communication.

14. The system of claim 8, wherein the operations further comprise:
receiving a new text document for a new communication, the new text document including one or more existing component token-sets that exist in the vocabulary;
identifying, for each existing component token-set of the one or more existing composite token-sets included in the new text document, the composite performance parameter; and
generating a new performance metric for the new text document, the new performance metric being based on a combination of the composite performance parameter of each existing component token-set of the one or more existing component token-sets.

15. A computer-program product tangibly embodied in a non-transitory machine-readable storage medium, including instructions configured to cause a processing apparatus to perform operations including:
retrieving a set of text documents associated with a plurality of previous communications, each text document of the set of text documents including one or more tokens characterizing a previous communication of the plurality of previous communications, and each previous communication of the plurality of previous communications having been interacted with by a recipient user device that received the previous communication;
identifying, for each text document of the set of text documents, a performance metric representing an aggregated value associated with a target outcome performed by at least a subset of a set of recipient user devices that received the text document in a previous communication of the plurality of previous communications;
identifying, for each new token-set of one or more new token-sets and using a trained artificial-intelligence algorithm, a predicted composite performance parameter representing a predicted impact that the new token-set would have on the target outcome, wherein each new token set of the one or more new token-set was not represented in the set of text documents;
generating a vocabulary of one or more token-sets from the set of text documents and of the one or more new token-sets, wherein each of at least one token-set of the one or more token-sets represents an ordered combination of tokens that are included in a same text document of the set of text documents;
generating, for each token-set of the one or more token-sets of the vocabulary and for each new token-set of the one or more new token-sets, a composite performance parameter representing an impact or predicted impact that the token-set or the new token-set has on the target outcome associated with the plurality of previous communications, wherein generating the composite performance parameter further comprises:
forming one or more subsets of the set of text documents, each subset of the one or more subsets corresponding to a range of the performance metric;
generating, for each token-set of the one or more token-sets, an occurrence parameter for each subset of the one or more subsets of the set of text documents, the occurrence parameter of a token-set for a given subset of text documents representing a prevalence of the token-set in the subset of text documents;
identifying a particular token-set of the one or more token-sets; and
for the particular token-set:
identifying the occurrence parameter of the particular token-set for each subset of the one or more subsets of the set of text documents; and
generating the composite performance parameter using an aggregation of the occurrence parameter of the particular token-set for each subset of the one or more subsets of the text documents;
generating an ordering for the one or more token-sets and the one or more new token-sets, the ordering being based on the composite performance parameter associated with each token-set of the one or more token-sets and each new token set of the one or more token sets; and
outputting a result corresponding to the ordering, wherein the result corresponds to a suggestion of a completion of a portion of a set of text, wherein the portion of a set of text was defined by input from a client device.

16. The computer-program product of claim 15, wherein generating the composite performance parameter further comprises:
generating a lift parameter for each token-set of the one or more token-sets, the lift parameters representing an average performance of a first subset of the set of text documents as compared to an average performance of a second subset of the set of text documents, wherein each text document of the first subset of text documents includes the token-set associated with the lift parameter, and wherein each text document of the second subset of text documents does not include the token-set associated with the lift parameter.

17. The computer-program product of claim 15, wherein generating the composite performance parameter further comprises:
identifying a subset of the set of text documents, each text document included in the subset corresponding to a previous communication that includes a particular token-set; and
generating the composite performance parameter based on a combination of the performance metric for each text document of the subset of text documents.

18. The computer-program product of claim 15, wherein generating the composite performance parameter further comprises:
forming one or more subsets of the set of text documents, each subset of the one or more subsets corresponding to a range of the performance metric;
generating, for each token-set of the one or more token-sets, an occurrence parameter for each subset of the one or more subsets of the set of text documents, the occurrence parameter of a token-set for a given subset of text documents representing a prevalence of the token-set in the subset of text documents;
identifying a particular token-set of the one or more token-sets; and
for the particular token-set:
identifying the occurrence parameter of the particular token-set for each subset of the one or more subsets of the set of text documents; and
generating the composite performance parameter using an aggregation of the occurrence parameter of the particular token-set for each subset of the one or more subsets of the text documents.

19. The computer-program product of claim 15, wherein the operations further comprise:
receiving an input corresponding to an instruction to create a new communication, the new communication being configured to include a text document; and
selecting at least one token-set from amongst the one or more token-sets, the at least one selected token-set being selected as a recommendation to include as part of the text document of the new communication.

20. The computer-program product of claim 19, wherein selecting the at least one token-set from amongst the ordered one or more token-sets further comprises:
presenting, on an interface, the one or more token-sets and the composite performance parameter associated with each token-set of the one or more token-sets, each of the one or more token-sets presented on the interface being selectable for including as part of the text document of the new communication.

* * * * *